No. 633,539. Patented Sept. 19, 1899.
C. H. WHEELER.
RUBBER TIRE FOR VEHICLES.
(Application filed Dec. 3, 1898.)
(No Model.)
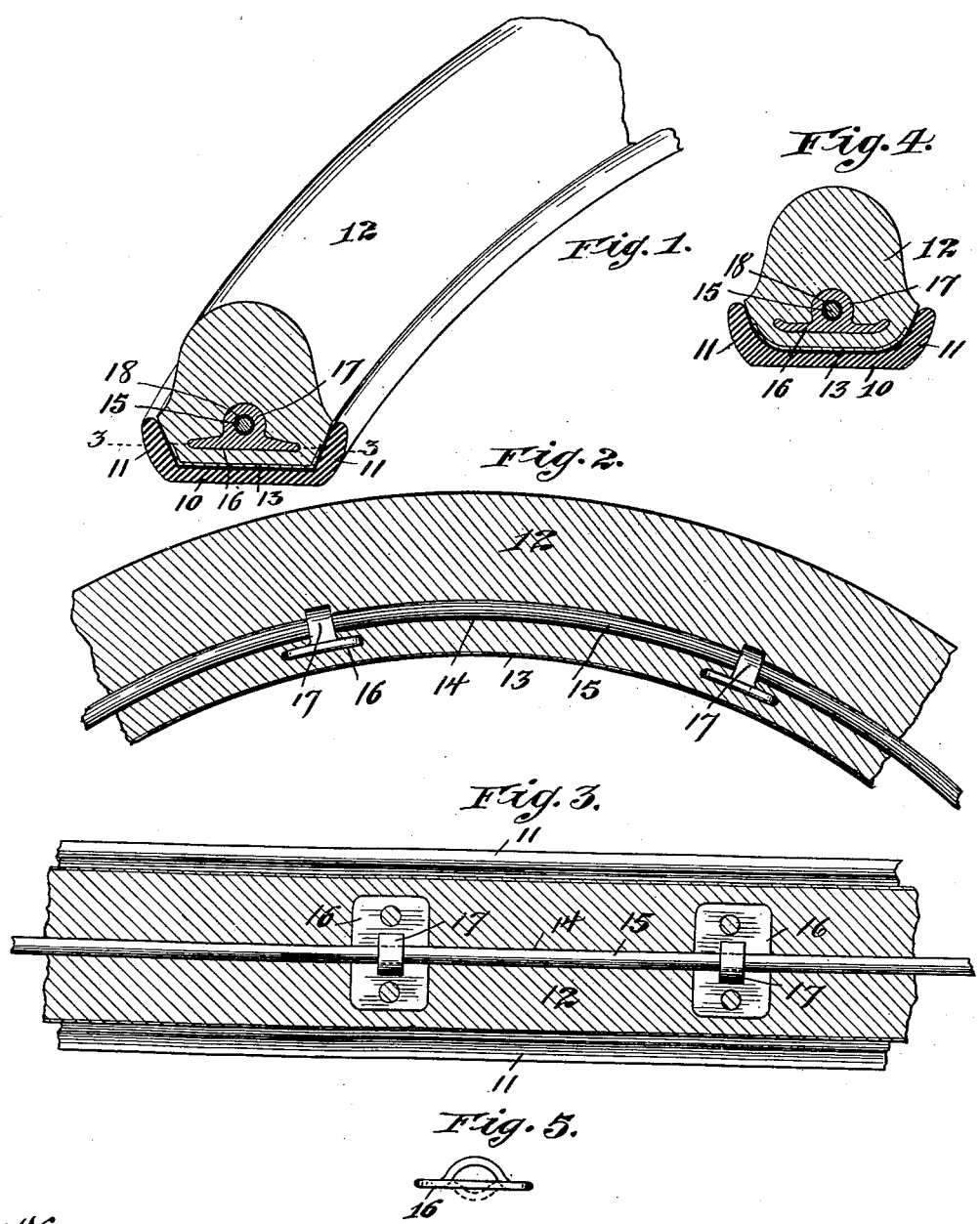
Witnesses,
Inventor,
Charles H. Wheeler,
By Offield, Towle & Linthicum,
Atty's.

UNITED STATES PATENT OFFICE.

CHARLES H. WHEELER, OF AKRON, OHIO.

RUBBER TIRE FOR VEHICLES.

SPECIFICATION forming part of Letters Patent No. 633,539, dated September 19, 1899.

Application filed December 3, 1898. Serial No. 698,200. (No model.)

*To all whom it may concern:*

Be it known that I, CHARLES H. WHEELER, of Akron, in the county of Summit and State of Ohio, have invented certain new and useful Improvements in Rubber Tires for Vehicles, of which the following is a specification.

This invention relates to rubber tires for vehicles, and has for its object to provide a tire having a tread portion or tire proper of rubber seated within a channeled metallic rim adapted to be applied to a vehicle-wheel, the construction being such that the rubber tire will be firmly held in place within the metallic rim by means of one or more retaining-wires, while at the same time cutting of the rubber by the action of the retaining devices and of the rim will be prevented.

To these ends my invention consists in certain novel features, which I will now proceed to describe and will then particularly point out in the claims.

In the accompanying drawings, Figure 1 is a perspective view, partly in transverse section, of a portion of a tire embodying my invention. Fig. 2 is a central longitudinal sectional view through the rubber portion of the tire or tire proper, the retaining-wire and plates being shown in elevation. Fig. 3 is a plan view, the rubber being shown in section on the line 3 3 of Fig. 1. Fig. 4 is a transverse sectional view illustrating certain modifications of the structural details, and Fig. 5 is a transverse sectional view illustrating a modified form of the retaining-plates.

My improved tire comprises a metallic rim 10, annular in form to fit upon the felly of a vehicle-wheel. This rim is grooved or channeled, as indicated in section in Figs. 1 and 4, the sides of the groove being formed by outwardly-extending flanges 11, which diverge from each other in an outward direction away from the wheel-center and which are preferably rounded at their extreme outer edges and upon their exposed lateral surfaces, as shown in the drawings. In connection with this metallic rim I employ a tire proper, 12, which is made of rubber, which is preferably of a configuration set forth in Design Letters Patent No. 26,338, granted November 24, 1896, to Jesse Lyman Dann. In this construction the inner portion of the tire, which lies within the channel of the rim, is shaped to conform to said channel or, in other words, is of a decreasing width inward toward the center of the wheel, while its outer or exposed portion is first concaved or inwardly rounded and then outwardly rounded as to its outer portion or apex. The tire is so proportioned to and located within the rim that the angle of junction between the inner and outer portions thereof lies at or outward beyond the outer periphery of the flanges 11, the concavity of the sides of the tire beyond said flanges preventing the outer or exposed portion of the rubber from being forced over the edges of the flanges and being thereby cut or injured and the rounding of the said edges of the flanges serving also to protect the rubber from injury in this manner. Furthermore, the location of the angle of meeting of the outer and inner portions of the rubber at or outwardly beyond the outer periphery of the flanges serves to prevent particles of dirt or other substances from entering between the rubber and the rim and thereby tending to damage and displace the tire. The inner portion of the tire, which is inclosed within the channel, is provided on its under side with a strengthening or reinforcing strip 13 of canvas or other suitable fabric or material.

While I prefer to give to the tire proper the configuration and relative proportions and arrangement to the rim just described, the main feature of my invention, to be hereinafter described, is applicable to other forms and proportions of tire.

The rubber tire is provided with an aperture or passage 14, extending continuously therethrough to receive the retaining-wire 15. This aperture may be located either at or below or above the plane of the meeting angles of the outer and inner portions of the tire, so that when the several parts are assembled said wire may lie either at or above or below the outer periphery of the flanges of the metallic rim. In conjunction with the retaining-wire 15 I employ a plurality of retaining-plates 16, which are embedded in and vulcanized to the rubber in such a manner as to cause the rubber and the plates to firmly adhere to each other, the plates being not loose in the rubber and being incapable of movement relatively thereto. These retaining-plates may be of any material of suitable rigidity, being preferably made of metal, such as steel or brass, and lying below the line of the aperture or passage 14, and consequently between the retaining-wire and the bottom of the rim 10. Each plate is of a width slightly less than the width of the channel of the rim at the bottom thereof and is curved to correspond to the curvature of the rim longitudinally of the tire, as indicated in Fig. 2. Each plate is also provided with an outwardly-extending loop or eye 17, which has a passage 18 therethrough for the retaining-wire 15. I employ the term "loop" or "eye" to indicate this part for the reason that I prefer to employ such a loop or eye which entirely incloses or surrounds the wire, forming substantially a continuation or portion of the aperture or passage 14; but I wish it understood that it is only essential for the purposes of my invention that said loop or eye should embrace the wire at the sides thereof, so as to prevent lateral movement of the wire relatively to the rim without tilting of the retaining-plates, so that I wish to be understood as including in said term "loop" or "eye" a construction in which the outer part of said loop or eye may be omitted.

The edges of the retaining-plates will be rounded off, as shown, in order to prevent cutting of the rubber at its points of contact with said angles, and where the plates are made of a material such as brass, which is not characterized by the highest degree of rigidity, they may be tapered, so as to be of increasing thickness at their central portion, as indicated in section in Fig. 1, although this taper may be omitted when the plates are made of steel or other highly rigid material.

The particular details of construction hereinbefore specifically described while deemed advantageous may be varied without departing from the principle of my invention. As an illustration of this I have indicated in Fig. 4 a construction which differs from that shown in Fig. 1 in that the flanges and bottom of the metallic rim do not meet at an angle internally, but are rounded at their junction, the rubber tire being similarly rounded and the outer lateral edges or portions of the retaining-plates being correspondingly curved upward and outward to maintain a sufficient thickness of rubber between said plates and the metallic rim at these points. I have also shown in Fig. 5 a modified form of retaining-plate in which the loop or eye is formed by cutting two parallel slits through the plate and forcing the strip thus formed upward by means of suitable dies. The body of the plate may be depressed at the same time, as indicated in dotted lines of said figure, in which case the passage is formed partly in the plate and partly in the strip.

By the employment of the retaining-plates embedded and held in the rubber and engaged with the retaining-wire I am enabled to prevent displacement of the wire and of the rubber tire from the rim and also to prevent the wire from cutting and destroying the rubber tire, for it will be seen that upon any attempt to move the wire laterally with respect to the rim such movement is resisted by the retaining-plate, which, owing to its being embedded in and adhering to the rubber, cannot move bodily in a lateral direction and which is prevented from tilting, so as to permit an outward movement of the wire, by reason of its broad bearing upon the rubber immediately above and adjacent to the bottom of the rim. The wire cannot move laterally without lateral movement of the retaining-plates, and these latter cannot move in this manner for the reason just stated. Moreover, the retaining-plates being embedded in and adhering to the rubber cannot move relatively to this latter and will not, therefore, tend to cut or fracture the rubber, as would be the case if they were capable of movement relatively thereto and were thereby adapted to enlarge and increase the opening formed by the space between them and the surrounding rubber. Furthermore, where the retaining-plates are provided with eyes which completely surround the retaining-wire there is a tendency for said wire to bind in the eyes when the rubber tire is in place in the rim owing to the fact that the wire is curved between the eyes and has a natural tendency to straighten itself, which tendency is exerted against the walls of the eyes and causes a binding of the wire in the eyes which prevents longitudinal moving or creeping of the wire within the tire.

It will be understood, of course, that the several parts are assembled in the manner usual in tires of this description, the wire being passed through the aperture or passage 14 in the rubber and through the openings 18 in the eyes 17, the opening in the eye being somewhat larger than the wire, so as to compensate for deviation in molding. The rubber is then compressed on the wire and the exposed ends of the latter joined by brazing, welding, electrically or otherwise, intertwisting, or in any other suitable manner. The rubber is then released and its meeting ends cemented together and the rubber tire placed within the metallic rim in any approved manner, or the ends of the wire and rubber may be joined after the tire is placed within the rim. If desired, two retaining-wires may be employed, the rubber tire being provided with two apertures or passages and each retaining-plate being provided with two eyes or loops. My present invention is, however, more particularly adapted for use with a single retaining-wire, being devised to that end, and the construction being such by reason of the broad bearing of the retaining-plates that efficiency in preventing the unseating of the tire is obtained by the use of such plates with a single retaining-wire equal to or greater than that obtained by the use of two retaining-wires, and I am thus enabled to dispense with one of the two retaining-wires usually employed in tires of this description.

In order to more firmly and intimately unite the retaining-plates with the rubber of the tire, I prefer to form apertures through said plates, as indicated at 19 in Figs. 2 and 3, the rubber extending through said apertures and uniting the body of rubber lying above said plate with that lying below it, and thereby still more firmly uniting the plate with the rubber of which the tire is composed. It should be understood, however, that the advantages attendant upon my improved construction may be attained in a great measure and to a satisfactory extent without permanently uniting the retaining-plates to the rubber of the tire in the manner hereinbefore set forth by causing adhesion of the surfaces of the two and by employing apertures in the plates through which the rubber may extend, as an operative structure may be produced by simply inclosing the plates in the rubber. Various other modifications will suggest themselves, and I do not wish to be understood as limiting myself to the precise details hereinbefore described, and shown in the accompanying drawings.

I am aware that it has been heretofore proposed to employ wire links in the molding of rubber tires for the purpose of properly centering the wire cores by means of which the apertures for the retaining-wires are formed, said links being arranged edgewise with respect to the rim and being left in the tire after it is molded. My present invention is distinguished from such a construction by reason of the fact that I employ plates having an extended bearing-surface and arranged not edgewise to but parallel with the body of the rim and serving by such extended bearing to prevent any disengagement of the tire by reason of the impossibility of their tilting under strain, as hereinbefore pointed out. Such plates being located at separated points or intervals within the tire and not directly connected with each other preserve the flexibility and resiliency of the tire and facilitate its application to the rim of the wheel.

I claim—

1. The combination, with a channeled metallic rim, of a rubber tire fitting within said rim and provided with an aperture or passage throughout its interior, independent retaining-plates, each having a broad bearing-surface, said retaining-plates being embedded in said rubber tire at separated points or intervals with their bearing-surfaces substantially parallel to the bottom of the rim, and said plates being provided with eyes or loops, and a retaining-wire passing through the aperture or passage in the rubber tire and through the eyes or loops of the retaining-plates, substantially as described.

2. The combination, with a channeled metallic rim, of a rubber tire fitting within said rim and provided with a central aperture or passage throughout its interior, independent retaining-plates, each having a broad bearing-surface, said retaining-plates being embedded in said rubber tire at separated points or intervals with their bearing-surfaces substantially parallel to the bottom of the rim, and each plate being provided with a central eye or loop, and a retaining-wire passing through the aperture or passage in the rubber tire and through the eyes or loops of the retaining-plates, substantially as described.

3. The combination, with a channeled metallic rim, of a rubber tire fitting within said rim and provided with an aperture or passage throughout its interior, independent retaining-plates, each having a broad bearing-surface, said retaining-plates being embedded in and permanently united by adhesion to said rubber tire at separated points or intervals with their bearing-surfaces substantially parallel to the bottom of the rim, and a retaining-wire passing through the aperture or passage in the rubber tire and through the eyes or loops of the retaining-plates, substantially as described.

4. The combination, with a channeled metallic rim, of a rubber tire fitting within said rim and provided with a central aperture or passage throughout its interior, a plurality of independent retaining-plates, each having a broad bearing-surface, said retaining-plates being embedded in said rubber tire at separated points or intervals with their bearing-surfaces substantially parallel to the bottom of the rim within the outer periphery thereof and provided with an outwardly-extending eye or loop, and a retaining-wire passing through the aperture or passage in the rubber tire and through the eyes or loops of the retaining-plates, substantially as described.

5. The combination, with a metallic rim having outwardly-diverging flanges forming a channel, of a rubber tire having a correspondingly-shaped inner portion to fit said channel and an outer portion the sides of which are at an angle to the inner portion and hollowed or concaved adjacent to the lines of junction, which are located at or outward from the outward periphery of said flanges, said rubber tire having an aperture or passage throughout its interior, independent retaining-plates, each having a broad bearing-surface, said retaining-plates being embedded in said rubber tire at separated points or intervals with their bearing-surfaces substantially parallel to the bottom of the rim and provided with outwardly-extending eyes or loops, and a retaining-wire passing through the aperture or passage in the rubber tire and through the eyes or loops of the retaining-plates, substantially as described.

CHARLES H. WHEELER.

Witnesses:
H. S. FIRESTONE,
IRVINE MILLER.